United States Patent [19]

Kageyama

[11] Patent Number: 5,023,219

[45] Date of Patent: Jun. 11, 1991

[54] DIELECTRIC CERAMIC COMPOSITION FOR ELECTRONIC DEVICES

[75] Inventor: Keisuke Kageyama, Osaka, Japan

[73] Assignee: Sumitomo Special Metal Co. Ltd., Osaka, Japan

[21] Appl. No.: 514,235

[22] Filed: Apr. 25, 1990

[30] Foreign Application Priority Data

Apr. 26, 1989 [JP] Japan .................................. 1-106836
Feb. 9, 1990 [JP] Japan .................................. 2-30415

[51] Int. Cl.$^5$ ............................................. C04B 35/40
[52] U.S. Cl. ...................................... 501/136; 501/135
[58] Field of Search ................................ 501/134, 135

[56] References Cited

U.S. PATENT DOCUMENTS

| | | |
|---|---|---|
| 4,429,052 | 1/1984 | Mateika et al. ...................... 501/135 |
| 4,692,421 | 9/1987 | Matsumoto et al. ................. 501/136 |
| 4,752,594 | 6/1988 | Hyuga et al. ........................ 501/135 |
| 4,830,995 | 5/1989 | Matsumoto et al. ................. 501/135 |

FOREIGN PATENT DOCUMENTS 0200855 10/1985 Japan .................................. 501/13 X

*Primary Examiner*—William R. Dixon, Jr.
*Assistant Examiner*—Alan Wright
*Attorney, Agent, or Firm*—Watson, Cole, Grindle & Watson

[57] ABSTRACT

A dielectric ceramic composition for use in making electronic devices has the formula:

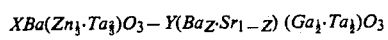

$$XBa(Zn_{\frac{1}{3}} \cdot Ta_{\frac{2}{3}})O_3 - Y(Ba_Z \cdot Sr_{1-Z})(Ga_{\frac{1}{2}} \cdot Ta_{\frac{1}{2}})O_3$$

where $X+Y=1$, $0.3 \leq X < 1$, $0.7 \geq Y > 0$, and $0 \leq Z \leq 1$.

5 Claims, No Drawings

DIELECTRIC CERAMIC COMPOSITION FOR ELECTRONIC DEVICES

BACKGROUND OF THE INVENTION

1. Field of the Invention:

This invention relates to a dielectric ceramic composition used in making electronic devices. More particularly, it is a composition which comprises compounds having the perovskite structure and is particularly useful in making devices used in the SHF range.

2. Description of the Prior Art:

There are known dielectric ceramic compositions which are used in making electronic devices because of their small loss of power and their good temperature characteristics. Those devices include a temperature compensating capacitor, a dielectric resonator for the direct reception of satellite broadcasting, or for a down converter, in which those compositions are used because of their small loss of power in the SHF range, and a substrate for a microwave strip line.

While many compounds having the perovskite structure are used for dielectric ceramic compositions which are employed in making devices used in the SHF range, the compounds which are used particularly widely are of the formula:

$$Ba(B_{\frac{1}{3}}.A_{\frac{2}{3}})O_3$$

where A is Ta, and B is a bivalent metal ion (one or more of Zn, Ni, Co and Mn). More specifically, the compound of the formula $Ba(Zn_{\frac{1}{3}}.Ta_{\frac{2}{3}})O_3$ is used above all.

The dielectric ceramic compositions which are intended for use in the SHF range are strictly required to have a high dielectric constant $\epsilon r$, a high unloaded Q value and a temperature coefficient of resonant frequency $\tau f$, of 0. These requirements call for the precise control of the composition of any such material which in turn necessitates a long time of sintering amounting to, say, 100 hours at a temperature of 1500° C.

It is particularly important to control the proportion of Zn accurately, as it is very likely to evaporate. Zn diffuses to the surface of a ceramic and volatilizes during a sintering operation, resulting in the formation of a compound not containing any Zn, such as $Ba_5Ta_4O_{15}$. This compound forms a "skin" and thereby makes it difficult to produce any ceramic having uniform quality and stable characteristics.

A long time of sintering at a high temperature is required for producing a material having a satisfactorily high unloaded Q value. The necessity for a long sintering time is an obstacle to the mass production of any material under consideration.

For these and other problems, reference is made to J. Am. Ceram. Soc., 68 [10], 546-51 (1985).

Moreover, some applications call for a material having a specifically controlled temperature coefficient, $\tau f$, at the resonant frequency. It is, however, known that the material of the formula $Ba(Zn_{\frac{1}{3}}.Ta_{\frac{2}{3}})O_3$ has a temperature coefficient in the vicinity of zero at the resonant frequency.

SUMMARY OF THE INVENTION

Under these circumstances, it is an object of this invention to provide an improved dielectric ceramic composition which is comparable, or even superior, to any known composition having the perovskite structure in unloaded Q, temperature coefficient and dielectric constant, is easy to control in composition without allowing for any substantial evaporation of Zn, and has such a high degree of sinterability as ensures the manufacture of ceramics having uniform quality by using only a short sintering time.

We, the inventor of this invention, made an extensive study of the possibility of overcoming the drawbacks of the known perovskite compound having the formula $Ba(Zn_{\frac{1}{3}}.Ta_{\frac{2}{3}})O_3$ and controlling the proportion of Zn in the dielectric ceramic composition. As a result, we found that the inclusion of specific trivalent metal ions would make it possible to control the proportion of Zn in the composition as desired, and thereby produce a ceramic having uniform quality, excellent electrical characteristics and high sinterability. This discovery led to the invention of a solid solution having the formula:

$$XBa(Zn_{\frac{1}{3}}.Ta_{\frac{2}{3}})O_3 - YSr(Ga_{\frac{1}{2}}.Ta_{\frac{1}{2}})O_3$$

We have, however, made a further study of the possibility of improving the unloaded Q value of the solid solution and controlling its temperature coefficient, $\tau f$, at the resonant frequency. As a result, we have found that its temperature coefficient at the resonant frequency can be varied as desired if the ratio of Ba and Sr at the A sites of the perovskite compounds is appropriately altered.

According to this invention, therefore, there is provided a dielectric ceramic composition for use in electronic devices which is basically represented by the formula:

$$XBa(Zn_{\frac{1}{3}}.Ta_{\frac{2}{3}})O_3 - Y(Ba_Z.Sr_{1-Z})(Ga_{\frac{1}{2}}.Ta_{\frac{1}{2}})O_3$$

where $X + Y = 1$;

$0.3 \leq X < 1$;

$0.7 \geq Y > 0$; and $0 \leq Z \leq 1$.

DETAILED DESCRIPTION OF THE INVENTION

The values of X and Y in the formula are required to fall within the ranges defined as $0.3 \leq X < 1$, and $0.7 \geq Y > 0$, respectively. If X is less than 0.3, and Y over 0.7, the composition will have an extremely low unloaded Q value and a very low temperature coefficient of resonant frequency, $\tau f$. If X is over 1 and Y is 0, no improved unloaded Q value will be achieved. The value of Z is in the range between 0 and 1, both inclusive, and its variation enables the desired variation in the temperature coefficient, $\tau f$, of the composition at the resonant frequency.

The composition of this invention has an unloaded Q value of 7,000 to 13,000, a temperature coefficiency of resonant frequency, $\tau f$, of maximum of 30 ppm/° C., and a dielectric constant, $\epsilon r$, of 28 to 32 at the frequency of 9 GHz. It is to be noted that the unloaded Q value and the dielectric constant are constant, but the temperature coefficient is varied with a case of $Z=0$ and a case of $0 < Z \leq 1$, that is, in the former case the temperature coefficient is in the range of from over 0 ppm/° C. to 30 ppm/° C. and in the latter case, in the range of from $-10$ ppm/° C. to 30 ppm/° C. Therefore, its electrical characteristics are comparable, or even superior, to those which have been exhibited by any known dielectric ceramic composition. When it is sintered, it is easier to control in composition, as the evaporation of Zn from the composition is restrained to a certain extent. It has high sinterability and requires only a short sintering time to produce a ceramic of uniform quality which is substantially free of any segregation of Zn. It can always be used reliably for making sintered products having such high quality.

Similar results can be obtained if a bivalent metal ion such as $Ni^{2+}$, $Co^{2+}$ or $Mn^{2+}$, or an alkaline earth ion such as $Ca^{2+}$ or $Mg^{2+}$, is substituted for about 20 mol % of Zn in the composition of this invention.

Moreover, the composition has an unloaded Q value of 10,000 to 13,000, a temperature coefficient of resonant frequency, $\tau f$, of $-5$ to 5 ppm/° C. and a dielectric constant, $\epsilon r$, of 9 to 31 at the frequency of 9 GHz if X, Y and Z are chosen to satisfy the relationship and ranges shown below:

$X+Y=1$, $0.9 \leq X < 1$, $0 < Y \leq 0.1$, and $0.3 \leq Z \leq 1$.

The invention will now be described more specifically with reference to examples and comparative examples.

EXAMPLES

The raw materials were weighed in such proportions as to form each of the compositions shown in TABLES 1 and 2 below, and were mixed together in a ball mill to make a wet mixture. The mixture was calcined at 1200° C. for two hours, and was, then, ground by the ball mill to form a powder having an average particle diameter of about one micron. The powder was compacted, and heated at a temperature of 1500° C. to 1600° C. to produce a sintered body having a diameter of 10 mm and a length of 20 mm.

Each of the sintered products was examined for its dielectric constant, $\epsilon r$, unloaded Q value, and the temperature coefficient of its resonant frequency, $\tau f$ (ppm/° C.), at 25° C. and 9 GHz. The results are shown in TABLES 1 and 2. The dielectric constants and unloaded Q values shown in TABLES 1 and 2 were determined by the method proposed by Hakki and Celeman, et al. and employing a dielectric resonator. The following relationship was found to exist between the temperature coefficient of resonant frequency, $\tau f$, permittivity, temperature coefficient of permittivity, $\tau \epsilon$, and the coefficient of linear expansion, $\alpha$, of the ceramic:

$$\tau f = -\tfrac{1}{2}\tau\epsilon - \alpha$$

It is obvious from TABLES 1 and 2 that the dielectric ceramic compositions according to this invention were all materials causing only a small loss of power and having a high dielectric constant, as the compositions shown in TABLE 1 exhibited a temperature coefficient of resonant frequency having a wide range from about 0 to +30 ppm/° C., and those shown in TABLE 2 a still wider range from $-10$ to $+30$ ppm/° C.

TABLE 1

| | | Composition $XBa(Zn_{\frac{1}{3}}Ta_{\frac{2}{3}})O_3$ $Y(Ba_zSt_{1-z})(Ga_{\frac{1}{2}}Ta_{\frac{1}{2}})O_3$ | | | Sintering conditions | Characteristics | | |
|---|---|---|---|---|---|---|---|---|
| | | X | Y | Z | | Dielectric constant $\epsilon t$ | Unloaded Q | Temperature coefficient $\tau f$ |
| Invention | 1 | 0.95 | 0.05 | 0 | 1500° C. × 2 Hr | 31 | 13000 | +5 |
| | 2 | 0.99 | 0.01 | 0 | 1500° C. × 2 Hr | 30 | 7000 | +9 |
| | 3 | 0.90 | 0.10 | 0 | 1500° C. × 2 Hr | 31 | 11000 | +8 |
| | 4 | 0.80 | 0.20 | 0 | 1500° C. × 2 Hr | 32 | 11000 | +10 |
| | 5 | 0.60 | 0.40 | 0 | 1600° C. × 2 Hr | 32 | 7500 | +30 |
| | 6 | 0.70 | 0.30 | 0 | 1550° C. × 2 Hr | 28 | 7800 | +22 |
| Comparative Examples | 7 | 1 | 1 | 0 | 1500° C. × 2 Hr | 27 | 6500 | −45 |
| | 8 | 1 | 0 | 0 | 1500° C. × 2 Hr | 30 | 3000 | +1 |
| | 9 | 0.75 | 0.25 | 0 | 1600° C. × 2 Hr | 28 | 3000 | +15 |

TABLE 2

| | | Composition $XBa(Zn_{\frac{1}{3}}Ta_{\frac{2}{3}})O_3$ $Y(Ba_zSr_{1-z})(Ga_{\frac{1}{2}}Ta_{\frac{1}{2}})O_3$ | | | Sintering conditions | Characteristics | | |
|---|---|---|---|---|---|---|---|---|
| | | X | Y | Z | | Dielectric constant $\epsilon t$ | Unloaded Q | Temperature coefficient $\tau f$ |
| Invention | 1 | 0.95 | 0.05 | 0.3 | 1500° C. × 2 Hr | 31 | 13000 | +3 |
| | 2 | 0.95 | 0.05 | 0.5 | 1500° C. × 10 Hr | 31 | 13000 | +1 |
| | 3 | 0.90 | 0.05 | 1.0 | 1500° C. × 24 Hr | 31 | 12000 | −3 |
| | 4 | 0.90 | 0.10 | 0.3 | 1500° C. × 2 Hr | 30 | 12000 | +6 |
| | 5 | 0.90 | 0.10 | 0.5 | 1500° C. × 10 Hr | 30 | 11000 | +4 |
| | 6 | 0.70 | 0.10 | 1.0 | 1500° C. × 24 Hr | 30 | 10000 | +2 |
| | 7 | 0.70 | 0.30 | 0.5 | 1550° C. × 10 Hr | 28 | 7500 | +17 |
| | 8 | 0.70 | 0.30 | 1.0 | 1550° C. × 24 Hr | 28 | 7000 | +12 |
| Comparative Examples | 9 | 0 | 1 | 0 | 1500° C. × 2 Hr | 27 | 6500 | −45 |
| | 10 | 0 | 0 | 1 | 1500° C. × 2 Hr | 26 | 4000 | −55 |
| | 11 | 1 | 0 | 0 | 1500° C. × 2 Hr | 30 | 3000 | +1 |
| | 12 | 0 | 0 | 1 | 1500° C. × 2 Hr | 30 | 3000 | −3 |

What is claimed is:

1. A dielectric ceramic composition for use in making electronic devices which is represented by the formula:

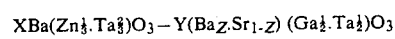

where ti $X+Y=1$;

$0.3 \leq X < 1$;

$0.7 \geq Y > 0$; and $0 \leq Z \leq 1$.

2. A composition as set forth in claim 1, and having an unloaded Q value of 7,000 to 13,000, a temperature coefficient of resonant frequency up to and including a maximum of 30 ppm/° C., and a dielectric constant of 28 to 32 at the frequency of 9 GHz.

3. A composition as set forth in claim 1, wherein said Z is 0, said composition having an unloaded Q value of 7,000 to 13,000, a temperature coefficient of resonant frequency ranging from a minimum greater than 0 ppm/° C. to a maximum equal to 30 ppm/° C., and a dielectric constant of 28 to 32 at the frequency of 9 GHz.

4. A composition as set forth in claim 1, wherein said Z is greater than 0, said composition having an unloaded Q value of 7,000 to 13,000, a temperature coefficient of resonant frequency ranging from a minimum greater than −10 ppm/° C. to a minimum equal to 30 ppm/° C., and a dielectric constant of 28 to 32 at the frequency of 9 GHz.

5. A composition as set forth in claim 1, wherein said X, Y and Z are:

$0.9 \leq X < 1$, $0.1 \geq Y > 0$, and $0.3 \leq Z \leq 1$, said composition having an unloaded Q value of 10,000 to 3,000, a temperature coefficient of resonant frequency ranging from −5 to +5 ppm/° C., both inclusive, and a dielectric constant of 9 to 31 at the frequency of 9 GHz.

* * * * *